United States Patent
Machura et al.

(10) Patent No.: US 11,142,477 B2
(45) Date of Patent: Oct. 12, 2021

(54) BENT GLASS SHEET HELD DURING THE COOLING THEREOF

(71) Applicant: SAINT-GOBAIN GLASS FRANCE, Courbevoie (FR)

(72) Inventors: Christophe Machura, Chevincourt (FR); Jérôme Gobin, Saint Leger aux Bois (FR); Hervé Thellier, Pimprez (FR); Loïc Croguennec, Thourotte (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 358 days.

(21) Appl. No.: 15/540,851

(22) PCT Filed: Dec. 29, 2015

(86) PCT No.: PCT/FR2015/053766
§ 371 (c)(1),
(2) Date: Jun. 29, 2017

(87) PCT Pub. No.: WO2016/108028
PCT Pub. Date: Jul. 7, 2016

(65) Prior Publication Data
US 2017/0349476 A1    Dec. 7, 2017

(30) Foreign Application Priority Data
Dec. 30, 2014    (FR) ...................................... 1463433

(51) Int. Cl.
*C03B 35/20* (2006.01)
*C03B 27/044* (2006.01)
(Continued)

(52) U.S. Cl.
CPC ............ *C03B 35/207* (2013.01); *C03B 23/03* (2013.01); *C03B 27/0442* (2013.01); *C03B 40/005* (2013.01); *C03B 2225/02* (2013.01)

(58) Field of Classification Search
CPC ............................ C03B 35/202; C03B 35/207
See application file for complete search history.

(56) References Cited

U.S. PATENT DOCUMENTS

| 1,999,558 A | 4/1935 | Black |
| 2,663,974 A | 12/1953 | Thomson |

(Continued)

FOREIGN PATENT DOCUMENTS

| EP | 0 250 311 A1 | 12/1987 |
| EP | 0 521 603 A1 | 1/1993 |

(Continued)

OTHER PUBLICATIONS

Shelby, James E. Introduction to Glass Science and Technology. Cambridge, UK, The Royal Society of Chemistry, 1997. pp. 187-189. (Year: 1997).*

(Continued)

*Primary Examiner* — Erin Snelting
(74) *Attorney, Agent, or Firm* — Pillsbury Winthrop Shaw Pittman LLP

(57) ABSTRACT

A cooling frame for a bent glass sheet, includes a support track for the sheet and a removable bearing piece that is able, in a bearing position and during cooling of the sheet by air blowing, to bear on the top face of the sheet and at the periphery thereof. The bent sheet cooled on the cooling frame maintains contact with the frame during the cooling operation and its shape complies better with that which is desired.

29 Claims, 2 Drawing Sheets

(51) Int. Cl.
  *C03B 23/03* (2006.01)
  *C03B 40/00* (2006.01)

(56) References Cited

U.S. PATENT DOCUMENTS

| | | |
|---|---|---|
| 2,683,334 A | 7/1954 | Rugg et al. |
| 4,074,996 A | 2/1978 | Hagedorn et al. |
| 4,892,574 A | 1/1990 | Cortes |
| 5,135,560 A | 8/1992 | Hashemi |
| 5,232,482 A * | 8/1993 | Laakso ............... C03B 23/0258 65/104 |
| 5,352,263 A * | 10/1994 | Kuster .................. C03B 23/035 65/106 |
| 5,974,834 A | 11/1999 | Rijkens et al. |
| 2017/0247280 A1 * | 8/2017 | Peng ....................... C03B 25/08 |

FOREIGN PATENT DOCUMENTS

| | | |
|---|---|---|
| JP | H11-228161 A | 8/1999 |
| WO | WO 2012/049433 A1 | 4/2012 |

OTHER PUBLICATIONS

International Search Report as issued in International Patent Application No. PCT/FR2015/053766, dated Mar. 16, 2016.

\* cited by examiner

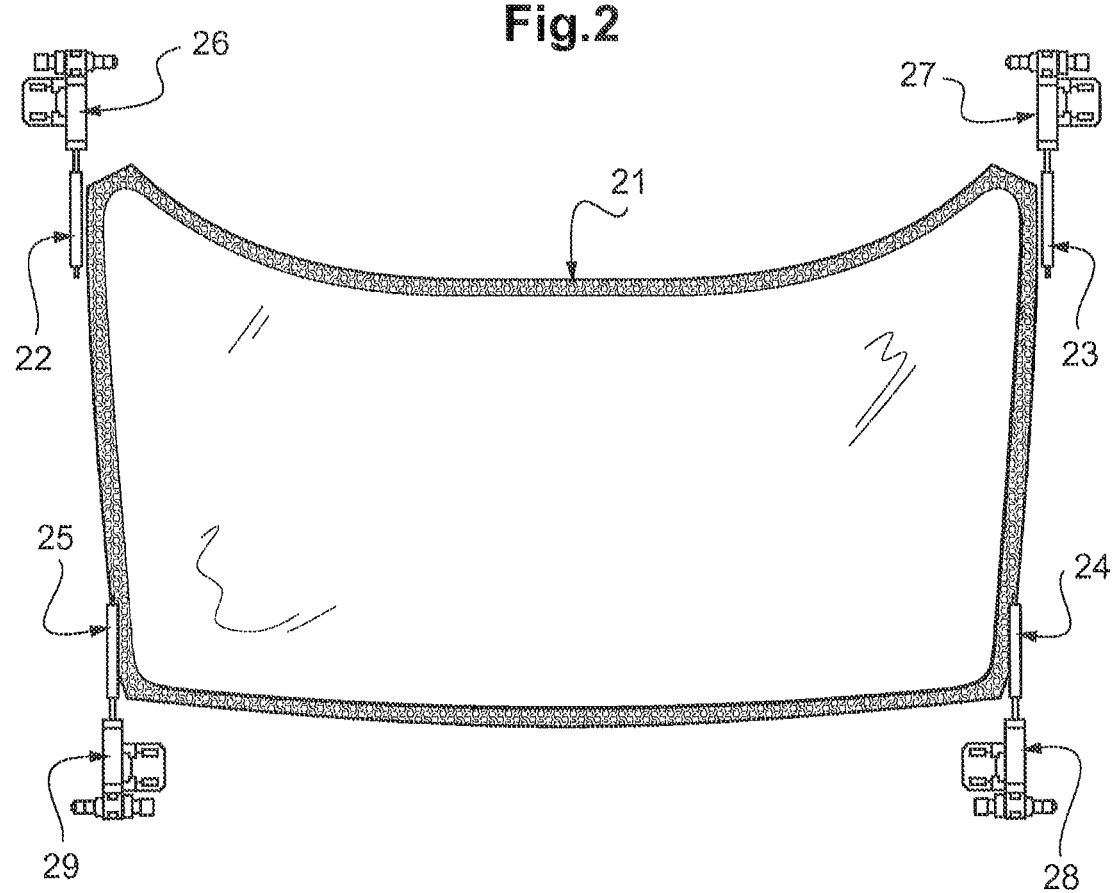

BENT GLASS SHEET HELD DURING THE COOLING THEREOF

CROSS-REFERENCE TO RELATED APPLICATIONS

This application is the U.S. National Stage of PCT/FR2015/053766, filed Dec. 29, 2015, which in turn claims priority to French patent application number 1463433 filed Dec. 30, 2014. The content of these applications are incorporated herein by reference in their entireties.

The invention relates to the field of the cooling of a bent glass sheet, in particular the toughening thereof.

The cooling of a glass sheet can be accelerated, in particular by air blowing, with the aim of bringing about internal stresses, the hardening thereof and of modifying the breaking behavior thereof. Particularly rapid cooling is referred to as thermal toughening. The breakage of a toughened glass pane occurs explosively, the entire glass plane being instantaneously transformed into small blunt pieces. Hardened or toughened glass is commonly used in urban areas and as automotive glazing, in particular as a side door window or rear window. Semihardened or hardened and nontoughened glass is glass that has been subjected to rapid cooling but less rapidly than for thermal toughening. Toughened glass is strongly hardened.

The thermal hardening of a bent glass sheet is usually carried out immediately after the bending thereof and by the following process:
- heating of a flat sheet to the thermal bending temperature, to the plastic deformation temperature thereof, usually between 580 and 700° C., then
- bending of the sheet, and then
- rapid cooling of the sheet by air blowing.

Thus, the thermal hardening treatment brought about by the cooling benefits from the fact that the sheet has had to be heated in order to be bent. For this cooling step, the sheet is placed on a toughening frame and positioned between an upper blowing box and a lower blowing box. The two main faces of the sheet (one facing up and the other facing down) are subjected to the cooling air blowing operation. The bending of the sheet can be carried out at least partially on the same frame as is subsequently used for cooling.

U.S. Pat. No. 5,974,834 teaches the bending and toughening of a glass pane comprising a small orifice, essentially so as to act as a motor vehicle rear window.

For cooling by air blowing, a glass sheet rests on a cooling frame in a horizontal position. When it rests on the cooling frame, the bent glass sheet generally has its most concave face upward. In fact, a bent glass sheet can have a shape more complex than entirely concave on one face and entirely convex on the other face. A glass sheet can be concave in one direction on one face and convex in another direction on the same face. FIG. 8a) of WO2012/049433 shows such a shape. A sheet can also have a curvature inversion on the same face, that is to say be concave in one region of said face and in one direction and convex in another region of said face and in the same direction (S shape).

The cooling frame comprises a track that is able to hold the periphery of the glass sheet. This track has a shape corresponding to the final desired shape of the glass sheet. It has been found that the final shape of the sheet could not correspond exactly to that desired even if the cooling frame clearly had the correct shape. The discrepancy in shape is even higher the more complex the shape of the sheet is, in particular when one of its faces comprises a curvature inversion in a given direction. One way of solving this problem is to compensate for the discrepancy in shape that is observed by an intentional discrepancy in shape on the cooling frame. However, such a step can require the production and testing of several cooling frames before the ideal shape is found. Moreover, for a given cooling frame, the modification of the thermal conditions for realizing the cooling again has the risk of there being consequences for the final shape of the sheet.

A means for cooling a glass sheet on a cooling frame such that the final sheet clearly has the same shape as that of the cooling frame has now been found. By virtue of this solution, it is now unnecessary to produce a multitude of frames by trial and error, and moreover, the thermal conditions for realizing the cooling operation can vary without having a great effect on the final shape. Observation of the behavior of sheets subjected to cooling by air blowing has shown that the corners of the sheet tend to lift slightly just before or during the blowing operation. We have thus envisaged holding the corners of the sheet by bearing on their top face at the problematic locations, that is to say those that are likely to lift during cooling or even already before cooling. This action has effectively made it possible to solve the abovementioned problem.

The invention is particularly useful for giving the periphery of the glass sheet the exact shape of the cooling frame when the edges of the sheet, especially the corners thereof, tend to lift during cooling, and generally likewise during the bending by gravity that takes place just before cooling on the cooling frame. This problem may arise for any type of shape, such as a saddle shape, an S shape or even a shape having small curves. This problem arises in particular when the bending method chosen involves an upper bending mold against which the glass sheet is pressed, the sheet then being received by the cooling frame according to the invention. Bending then continues on this cooling frame with a tendency for the corners to lift. This tendency is observed between the moment at which the glass rests on the cooling frame and up to the point at which the glass is solidified by cooling, thereby ending the deformation thereof. This behavior is even stronger when the operation of pressing against the upper mold is carried out in an oven, the inside of which is brought to the bending temperature, the cooling frame according to the invention then entering the oven in order to be positioned under the upper bending mold and to receive the sheet that has just been bent by the upper bending mold. The cooling frame according to the invention carrying the bent sheet then leaves the oven in order to be positioned in the cooling region between toughening boxes which will blow cooling air over the two main faces of the glass sheet. The cooling of the sheet on the frame according to the invention is thus carried out on the sheet, the heat of which originates from the bending step which has just taken place. The temperature of the sheet only decreases between the end of its contact with the upper bending mold and the start of blowing.

A high degree of collapse, generally greater than 1 cm, and even greater than 2 cm, or even greater than 3 cm, can be observed between the moment at which the glass rests on the cooling frame and the moment at which the glass is solidified by cooling, it being possible for the time difference between these two moments to be greater than 1 second and even greater than 2 seconds. The higher the degree of this collapse, the more the edges of the glass, especially the corners, tend to lift.

The invention also relates to the device comprising the cooling frame according to the invention and the blowing system for blowing air towards the two main faces of the glass sheet. The blowing system comprises blowing boxes disposed on either side of the sheet, facing the two main faces, each blowing box being provided with orifices for blowing air towards a main face. The cooling frame supporting the glass sheet to be cooled is positioned between the boxes and the blowing of air onto the two main faces brings about the cooling of the sheet. Toughening involves a rate of cooling of the glass skin of at least 30° C./second. Semitoughening involves a rate of cooling of the glass skin of at least 15° C./second.

FIG. 2 shows a support track for a cooling frame, each of the four corners of the support track being provided with a bearing piece according to the invention that is actuated by a rotary cylinder, the bearing pieces being in a separated position.

Figure 1:
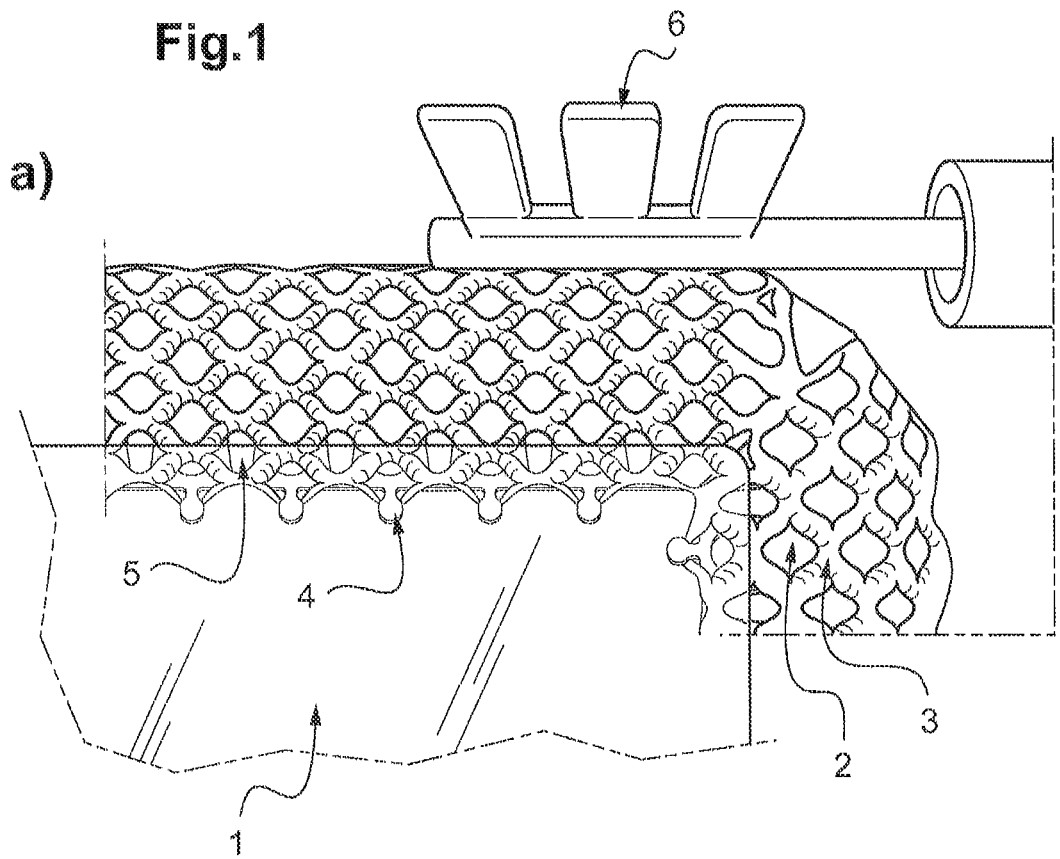
FIG. 1 shows the corner of a glass sheet placed on the cooling frame according to the invention, a bearing piece being in a separated position in a) and in a bearing position in b).
Figure 1:
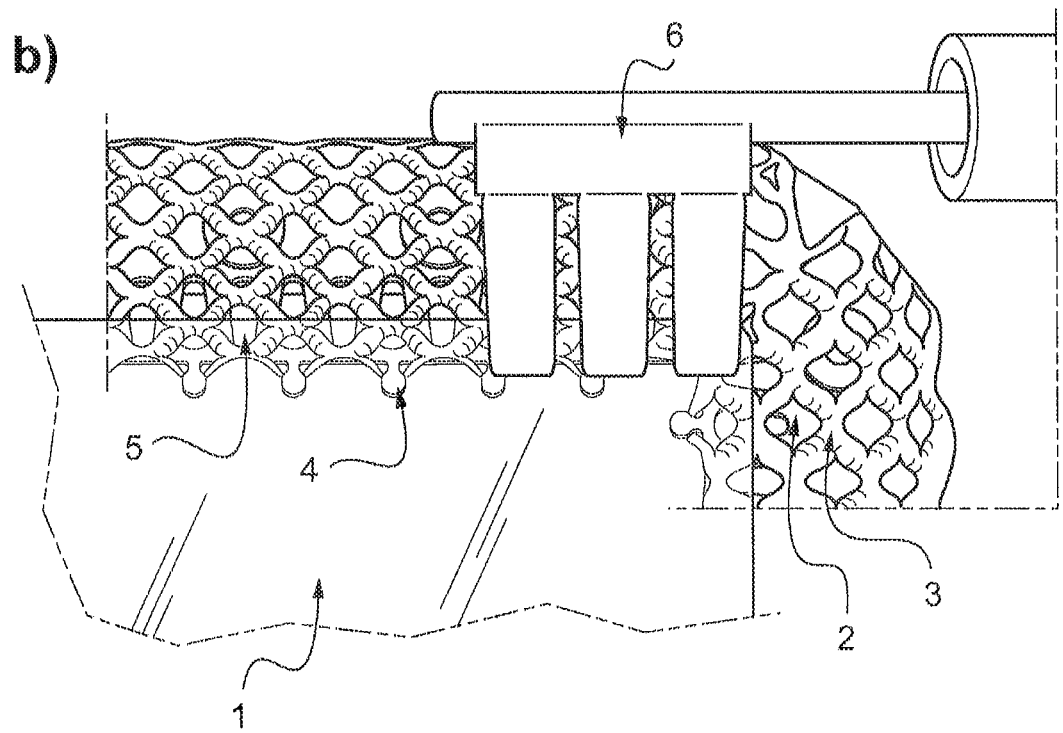

The invention firstly relates to a cooling frame for a bent glass sheet, comprising a support track for the sheet and a removable bearing piece that is able, in a bearing position, to bear on the top face of the sheet and at the periphery thereof. The support track has a shape corresponding to the final desired shape of the glass sheet. This support track is generally connected to a more rigid structural frame. This structural frame can be positioned under the support track. It can also surround the support track. An adjustment means that is part of the connecting means between the structural frame and the support track makes it possible to act on the shape of the support track by moving points of the support track from the fixed structural frame. The bearing piece can be connected to the support track or to the structural frame. This bearing piece is removable in that it can pass from the bearing position bearing on the sheet to a separated position by being moved away from the sheet so as not to be located above the latter when seen from above. In the separated position, the bearing piece no longer touches the sheet. The bearing piece is thus in the separated position before the glass sheet rests on the support track of the cooling frame and after the glass sheet has been cooled to a sufficient extent such that there is no longer a risk of changing the shape of the sheet. This separated position makes it possible to free up sufficient space above the support track in order to place the sheet on the support track prior to cooling and in order to move away and thus recover the sheet from the cooling frame after cooling. In particular, the glass sheet can be separated from the cooling frame by an operation of blowing air from below that is sufficiently powerful to lift the sheet, or by the sheet being gripped from above by a suction cup gripper.

In particular, the movement of the bearing piece in order to pass from the bearing position to the separated position can be carried out under the action of a cylinder, in particular a pneumatic cylinder, in particular a rotary pneumatic cylinder. Thus, the removable bearing piece can rotate about a fixed axis in order to pass from the bearing position to the separated position and vice versa.

The bearing piece is positioned so as to bear at a location of the rim of the glass that lifts in the absence of bearing by the bearing piece. The cooling frame can comprise several bearing pieces, in particular four bearing pieces, that each act on a different location on the periphery of the glass sheet, said location being likely to lift in the absence of a bearing piece. A location in question is often a corner of the sheet, but it may also be located at an indentation in an edge of the sheet. In practice, cooling tests without a bearing piece are carried out beforehand in order to observe the locations at which it is appropriate to equip the cooling frame with bearing pieces, and secondly, for production, the cooling frame is equipped with bearing pieces at the locations that require them. In particular, the bearing piece can bear on the sheet at one of the corners thereof and, if need be, at several of the corners thereof. In the case of a sheet comprising several corners, the cooling frame can be equipped with several bearing pieces, in particular as many bearing pieces as there are corners. Generally, the glass sheet comprises four corners and the cooling frame comprises four bearing pieces for treating each of these corners.

The bearing piece exerts a pressure on the glass sheet that is sufficient for the latter not to come away, locally (that is to say under the bearing piece), from the support track during cooling. Generally, this pressure is in the range from 20 g/cm$^2$ to 1000 g/cm$^2$.

The bearing piece generally bears on an area in the range from 0.2 to 20 cm$^2$. This area relates to each bearing piece that is used. If n bearing pieces are used, the total bearing area that is used per sheet is n times 0.2 to 20 cm$^2$, distributed over n locations. The bearing piece is perforated, i.e. it allows air to pass between different regions of contact between said bearing piece and the glass. To this end, it can have for example the shape of a "hand" with three fingers, as can be seen in FIG. 1. Advantageously, this bearing piece is made of a thin steel plate (for example each finger of the "hand" is a thin steel plate) the elasticity of which makes it possible to soften and meter the pressure exerted on the glass, in particular at the moment of contact. Preferably, the bearing piece is provided with an insert made of refractory fibers for coming into contact with the glass.

The peripheral region in which the bearing piece bears on the top face of the sheet is generally between the edge of the glass and three centimeters from the edge of the glass. Preferably, bearing is carried out on the top face of the sheet between the edge of the glass and one centimeter from the edge of the glass.

The invention also relates to a method for cooling a bent glass sheet on a cooling frame by blowing cooling air, the cooling being carried out on the cooling frame according to the invention, the removable bearing piece bearing on the top face of the sheet and at the periphery thereof during the cooling air blowing operation. Preferably, the bearing piece already bears on the sheet before the start of the cooling air blowing operation. The bearing piece bears on the sheet just after the bent sheet has been set down on the track of the cooling frame and preferably already before the start of blowing. The invention is particularly useful for cooling a sheet having a curvature inversion in a given direction on the same face. It is also particularly useful in the case of the cooling of large sheets, in particular in which the area of a main face is greater than 0.8 m$^2$.

The cooling carried out on a sheet resting on the cooling frame according to the invention is in particular a thermal semitoughening operation or a thermal toughening operation. In order to carry out a semitoughening or toughening treatment, the air pressure in the blowing boxes is between 500 and 4000 mm of water column, it being understood that the greater the pressure, the greater the hardening effect (that is to say the toughening effect).

Thus, the invention also relates to a method for manufacturing a bent glass sheet, comprising the thermal bending of the sheet and then the cooling of the sheet by the cooling method on the cooling frame according to the invention. This method can comprise bending by pressing against an upper bending mold, in particular in an oven at the deformation temperature of the glass, in particular a solid bending mold, then reception of the sheet on the cooling frame in the oven, then removal of the cooling frame carrying the sheet from the oven, then positioning of the cooling frame carrying the sheet between blowing boxes, and then blowing of air by the blowing boxes onto the two main faces of the sheet. In particular, the bending by pressing can be carried out by suction against the upper mold, the latter being able to be provided with suction means for keeping the sheet against it. The cooling frame can be positioned under the bending mold holding the sheet against it by suction, and then the stopping of the suction allows the sheet to detach from the upper mold and to be received on the cooling frame. A lower counterpart mold also makes it possible to press the sheet against the upper bending mold.

FIG. 1 shows the corner of a glass sheet 1 placed on the cooling frame according to the invention. In a), the metal track 2 covered with a knitted fabric 3 made of refractory fibers can be seen, said knitted fabric being held on the track by virtue of protuberances 4. The track comprises through-orifices 5 for increasing access of the cooling air coming from below to the sheet. A bearing piece 6, of the "hand" type comprising three fingers made of thin steel plates, is in the separated position. In b), the same elements can be seen as in a), the bearing piece 6 being in the bearing position. An insert of the fabric or felt type made of refractory fibers (not shown) equips the bearing piece 6 in order to come into contact with the glass.

FIG. 2 shows a support track 21 of a cooling frame according to the invention. Each of the four corners of the support track 21 is provided with a bearing piece 22, 23, 24, 25 shown in the separated position (as in FIG. 1a)). Each bearing piece is actuated by a rotary pneumatic cylinder 26, 27, 28, 29 for moving each bearing piece from a separated position to a bearing position by simple rotation.

The invention claimed is:

1. A device for cooling a bent glass sheet, comprising a cooling frame and air-blowing boxes configured to blow air onto two main faces of the bent glass sheet, wherein the cooling frame comprises a support track for the bent glass sheet and a removable bearing piece that, in a bearing position and during cooling of said bent glass sheet by air blowing with said air-blowing boxes, bears on a top face of the bent glass sheet and at a periphery thereof, said air-blowing boxes being adapted to supply air flow onto the two main faces of the bent glass sheet when the removable bearing piece is in the bearing position to impart rapid cooling of a skin of the bent glass sheet forming said two main faces at a rate of cooling of at least 15° C./seconds,
wherein the removable bearing piece is movable between the bearing position and a separated position in which the removable bearing piece is out of contact with said top face, and
wherein the device is adapted to move the removable bearing piece from the separated position to the bearing position after the bent glass sheet rests on the cooling frame and prior to cooling the bent glass sheet.

2. The device as claimed in claim 1, wherein the bearing piece can pass into the separated position by being moved away from the sheet so as not to be located above the sheet when seen from above.

3. The device as claimed in claim 2, wherein the removable bearing piece rotates about a fixed axis in order to pass from the bearing position to the separated position and vice versa.

4. The device as claimed in claim 1, wherein the bearing piece is removable under the action of a cylinder.

5. The device as claimed in claim 1, wherein the bearing piece bears on the sheet at one corner thereof.

6. The device as claimed in claim 1, wherein the bearing piece exerts a pressure in the range from 20 g/cm$^2$ to 1000 g/cm$^2$.

7. The device as claimed in claim 1, wherein the bearing piece bears on an area in the range from 0.2 to 20 cm$^2$.

8. The device as claimed in claim 1, wherein the bearing piece bears on the top face of the sheet in a region between an edge of the glass and three centimeters from the edge of the glass.

9. The device as claimed in claim 8, wherein the bearing piece bears in a region between the edge of the glass and one centimeter from the edge of the glass on the top face of the sheet.

10. The device as claimed in claim 1, wherein the cooling frame further comprises another removable bearing piece that, in the bearing position and during cooling of said sheet by air blowing, bears on the top face of the sheet and at the periphery thereof, wherein said removable bearing piece and said other removable bearing piece each act on a different location at the periphery of the glass sheet.

11. The device as claimed in claim 10, wherein the cooling frame comprises four removable bearing pieces, each acting on a different location at the periphery of the glass sheet.

12. The device as claimed in claim 1, wherein the cooling frame further comprises another removable bearing piece that, in the bearing position and during cooling of said bent glass sheet by air blowing, bears on the top face of the bent glass sheet and at the periphery thereof, wherein said removable bearing piece and said other removable bearing piece bear on the bent glass sheet at two different corners thereof.

13. The device as claimed in claim 1, wherein the removable bearing piece includes a plurality of fingers that bear on the top face of the bent glass sheet during cooling of said sheet by air blowing.

14. The device as claimed in claim 1, wherein said removable bearing piece is attached to a rotatable shaft that extends along a fixed axis such that rotation of the rotatable shaft about the fixed axis in a first rotation direction rotates the removable bearing piece towards the bent glass sheet to place the removable piece in the bearing position and rotation of the rotatable shaft about the fixed axis in a second rotation direction opposite the first rotation direction rotates the removable bearing piece away from the bent glass sheet to place the removable bearing piece in the separated position, said rotatable shaft being out of contact with the bent glass sheet when the removable piece is in the bearing position.

15. The device as claimed in claim 1, wherein the rate of cooling is at least 30° C./seconds.

16. The device as claimed in claim 1, wherein the cooling frame is a gravity bending frame that is adapted to bend a glass sheet to form said bent glass sheet, and wherein the device is adapted to move the removable bearing piece from the separated position to the bearing position after the glass sheet rests on the cooling frame and prior to bending the glass sheet by gravity.

17. A method for preparing a bent glass sheet, comprising thermal bending of a glass sheet to form the bent glass sheet and then cooling the bent glass sheet by air blowing, wherein the cooling is carried out by a cooling device comprising a cooling frame and air-blowing boxes configured to blow air onto two main faces of the bent glass sheet, wherein the cooling frame comprises a support track for the bent glass sheet and a removable bearing piece that, in a bearing position and during cooling of said bent glass sheet by air blowing with said air-blowing boxes, bears on a top face of the bent glass sheet and at a periphery thereof, said air-blowing boxes being adapted to supply air flow onto the two main faces of the bent glass sheet when the removable bearing piece is in the bearing position to impart rapid cooling of a skin of the bent glass sheet forming said two main faces at a rate of cooling of at least 15° C./seconds, wherein the removable bearing piece is movable between the bearing position and a separated position in which the removable bearing piece is out of contact with said top face, and wherein the device is adapted to move the removable bearing piece from the separated position to the bearing position after the bent glass sheet rests on the cooling frame and prior to cooling the bent glass sheet.

18. The method as claimed in claim 17, wherein, between a moment at which the glass sheet rests on the cooling frame and a moment at which it has solidified, the glass sheet collapses by more than 1 cm.

19. The method as claimed in claim 18, wherein, between the moment at which the glass sheet rests on the cooling frame and the moment at which it has solidified, the glass sheet collapses by more than 2 cm.

20. The method as claimed in claim 19, wherein, between the moment at which the glass sheet rests on the cooling frame and the moment at which it has solidified, the glass sheet collapses by more than 3 cm.

21. The method as claimed in claim 17, wherein the bearing piece exerts a pressure on the glass sheet that is sufficient for the latter not to come away, locally, from the support track during the air blowing operation.

22. The method as claimed in claim 21, wherein the bearing piece exerts a pressure in the range from 20 g/cm$^2$ to 1000 g/cm$^2$.

23. The method as claimed in claim 17, wherein the bearing piece starts to bear on the top face of the sheet and at the periphery thereof before the blowing of cooling air.

24. The method as claimed in claim 17, wherein, for cooling, the cooling frame supporting the glass sheet is positioned between the blowing boxes, and then the blowing boxes blow air onto the main faces of the glass sheet.

25. The method as claimed in claim 24, further comprising bending by pressing against an upper bending mold, then reception of the bent glass sheet on the cooling frame, then positioning of the cooling frame carrying the sheet between the blowing boxes, and then cooling of the bent glass sheet by air blown by the blowing boxes.

26. The method as claimed in claim 25, wherein the bending by pressing is carried out in an oven at a glass deformation temperature, then the bent glass sheet is collected in the oven by the cooling frame, then the cooling frame carrying the bent glass sheet leaves the oven in order to be positioned between the blowing boxes, and then the bent glass sheet is cooled by the air blowing operation.

27. The method as claimed in claim 24, wherein the air pressure in the blowing boxes is between 500 and 4000 mm of water column.

28. The method as claimed in claim 17, wherein the bent glass sheet has a main face area greater than 0.8 m$^2$.

29. The method as claimed in claim 17, wherein the cooling is a thermal semitoughening operation or a thermal toughening operation.

* * * * *